Dec. 30, 1969   C. F. BOESTER   3,487,015
APPARATUS AND METHOD FOR TREATING WASTE FLUIDS
Filed April 22, 1968

Inventor
Carl F. Boester
By Bedell & Burgess
attys.

United States Patent Office 3,487,015
Patented Dec. 30, 1969

3,487,015
APPARATUS AND METHOD FOR TREATING WASTE FLUIDS
Carl F. Boester, Arlington, Va.
(P.O. Box 567, Lafayette, Ind. 47902)
Filed Apr. 22, 1968, Ser. No. 722,884
Int. Cl. C02c 1/10, 1/02
U.S. Cl. 210—12        8 Claims

ABSTRACT OF THE DISCLOSURE

Equipment and method for combined aerobic and anaerobic bacterial and pasteurizing treatment of human waste fluids and comprising a filter receptacle, a receptacle for fluid from the filter receptacle provided with a pasteurizing heater and a regenerative heater unit utilizing the temperature of the pasteurized fluid to raise the temperature of the filtered fluid before it is pasteurized, there being supply and discharge conduits and means pumping the fluid from the pasteurizing receptacle and regenerative heater and preferably including automatic means controlling the temperature in the pasteurizing receptacle and automatically controlling the action of the pump means by the level of fluid in the pasteurizing receptacle.

---

The invention described herein is particularly adapted for, but not limited in its use to, the disposal of sewage and other unsafe liquid wastes from households which are not connected to a community sewer system.

A main object of the invention is to meet objections by health officials and others to the discharge of waste fluids either to the earth surface or to the underground without requiring chlorination or sand filter, either of which is relatively costly to install or to maintain, or both.

In the accompanying drawings which illustrate, largely diagrammatically, a relatively simple and moderate cost filter, bacterial treatment and pasteurizing installation:

Figure 1:
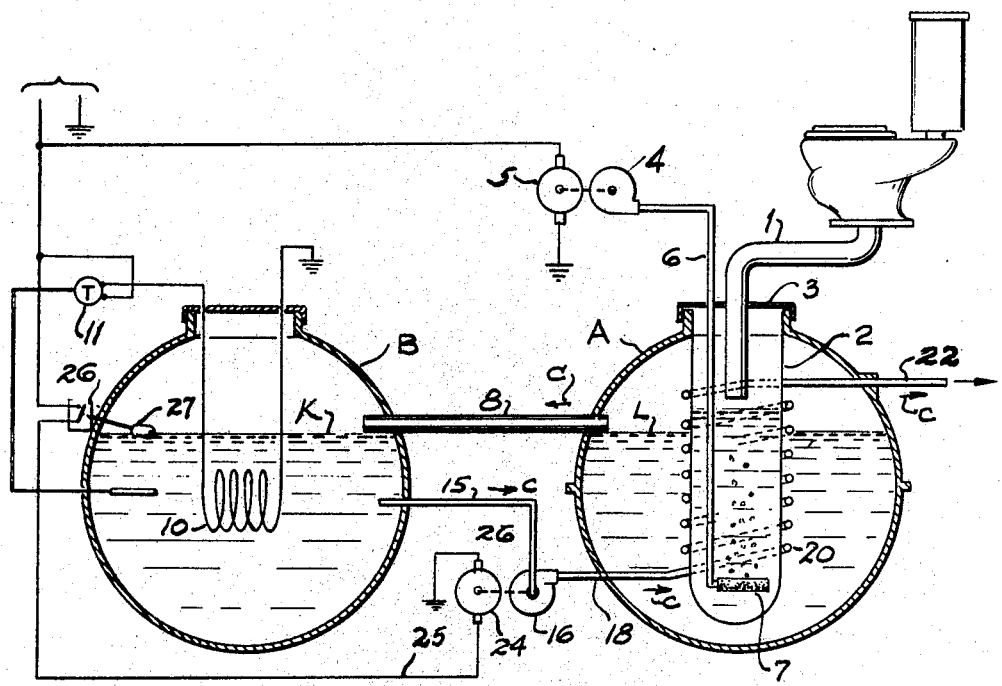
FIG. 1 shows a primary tank or receptacle A and a secondary tank or receptacle B to be buried in the ground adjacent to a residence or other building.

In FIG. 1, raw waste from the building flows through a conduit 1 to a filter bag 2 of nonclogging, self-cleaning plastic fiber material having an opening, with a removable cover 3, above level L of liquid maintained in the tank.

An air compressor 4 normally operated substantially continuously by a small motor 5, discharges through a pipe 6 to a diffuser 7 in the lower portion of filter bag 2. As the aerated liquid passing through the filter rises to the level L, it flows by gravity through pipe 8 into tank B in which the fluid level K is the same level L in tank A.

Within tank B is an electric resistance heater 10 controlled by a single pole thermostat 11 set to maintain the temperature of the fluid in tank B at approximately 140° Fahrenheit or at such temperature as will pasteurize the fluid in tank B in about thirty minutes.

Piping 15 leads from below level K in tank B to a pump 16, and thence through piping 18 to a regenerative heat exchange coil device 20 which preferably surrounds filter 2 in tank A, thereby utilizing the heat of the pasteurized fluid from tank B to raise the temperature of the liquid in tank A. Fluid in the regenerative heat exchange coil device is discharged from the upper portion of the coil device through a conduit 22 which leads to the earth, either surface or subsurface, or to any other facility which may be acceptable to health officials or otherwise required.

Pump 16 is driven by a motor 24 energized by a circuit 25 closed and opened by a single pole switch 26 controlled by a float 27 actuated by the height of liquid in tank B so as to maintain the liquid level as indicated at K.

As additional liquid is discharged into filter bag 2 through conduit 1, it is aerated and purified by bacteria and oxidation and warmed by regenerative coil 20. It then flows into tank B where it is subjected to the pasteurizing temperature maintained by coil 10. Pump 16 draws off the heated, pasteurized fluid through pipe 15 and leads it to regenerative coil 20 from which it is fed to discharge conduit 22. The oxidation and pasteurizing treatment eliminates harmful bacteria, combustible solids and unpleasant odors at a moderate operating expense, and results in a cooled discharge effluent which is harmless and complies with sanitary requirements.

Figure 2:
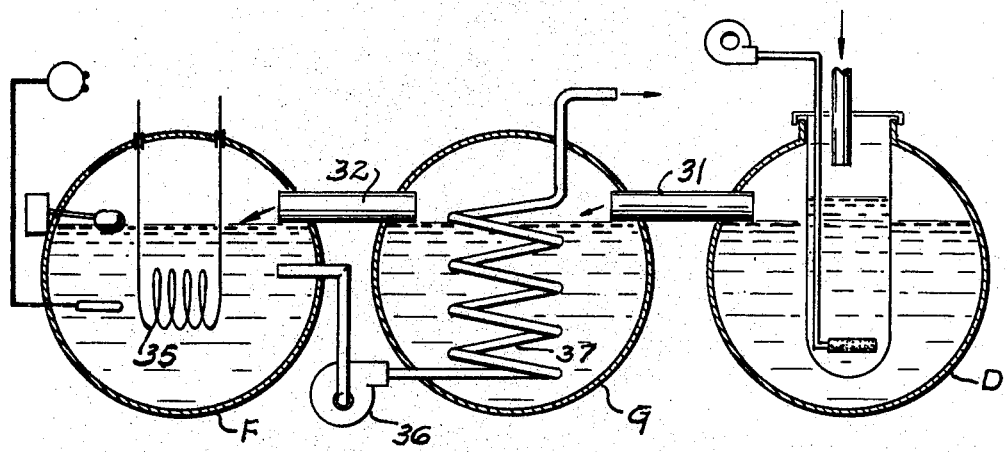
FIG. 2 shows a modified structure embodying similar essential equipment but utilizing different units.

In FIG. 2 the main tanks D and F correspond generally to tanks A and B but the regenerative heating unit is separate from tanks D and F and includes a separate receptacle or tank G which receives the filtered fluid from tank D through pipe 31, and after flowing through pipe 32 into tank F, is heated by coil 35 and then forced by pump 36 through regenerative coil 37. The use of this intermediate tank readily accommodates variation in relative volume and temperature of the tanks but does not affect the essention relations between the units.

Another variation (not illustrated) would involve the inclusion of all three receptacles as compartments of a single tank.

These and other arrangements may be made without departing from the spirit of the invention or materially affecting the method of operation, and exclusive use of such modifications as come within the scope of the claims is contemplated.

I claim:

1. In apparatus for combined aerating, bacterial and pasteurizing treatment of waste fluid to produce an effluent harmless to humans, a receiving chamber with filter means, means for aerating fluid in said chamber, a primary receptacle for filtering fluid from said chamber, a secondary receptacle provided with a pasteurizing heater and having an inlet for filter fluid from said primary receptacle, a regenerator heat exchanger surrounded by fluid filtered from said receiving chamber in said primary receptacle, and means for conducting fluid from said secondary receptacle through said heat exchanger and from the latter to a discharge outlet.

2. Apparatus according to claim 1 in which the primary receptacle encloses the receiving chamber, the filter means and the heat exchanger.

3. Apparatus according to claim 1 in which the receiving chamber and the regenerative heat exchanger are positioned side by side within the primary receptacle, the inlet from the aerator being near the lower portion of the primary receptacle and the receiving chamber, and the outlet from the primary receptacle being near the upper portion thereof.

4. Apparatus for treatment of waste fluid according to claim 1 which includes an electric pump for feeding pasteurized fluid from the secondary receptacle to the heat exchanger, there being a float in the secondary receptacle limiting the operation of said pump to the rise of the liquid in the secondary receptacle to a predetermined level.

5. Apparatus as described in claim 1 which includes a thermostat device controlling the action of the pasteurizing heater.

6. Apparatus as described in claim 1 including a float switch in the secondary receptacle closing an electric circuit to operate said pump when the liquid in the secondary receptacle rises above a predetermined level, and including a thermostat device controlling the action of the heater.

7. In apparatus for combined aerobic and pasteurizing treatment of sewage and other waste fluid containing bacteria harmful to humans, a primary receptacle for waste fluid, a fluid filter within said receptacle, means supplying air to the lower portion of said receptacle, a secondary receptacle separate from said primary receptacle, a passageway for gravity flow of filtered fluid from the primary receptacle to the secondary receptacle, a pasteurizing heater in said secondary receptacle, a regenerative heater coil in the primary receptacle, a conduit from said secondary receptacle to said coil, a pump in said conduit, and an outlet from said regenerative heater coil discharging to the exterior of the apparatus.

8. The method of treatment waste fluids from an individual household which comprises aerating the waste fluid, filtering the aerated fluid and then subjecting the filtered fluid to pasteurizing heat, passing the pasteurized fluid into heat-exchanging relation with the fluid being aerated before it is pasteurized, thereby utilizing the heat of the pasteurized fluid to preliminarily heat the fluid being aerated and simultaneously cooling the pasteurized fluid substantially below the pasteurizing temperature, and then discharging the resulting cooled pasteurized fluid to the earth.

References Cited

UNITED STATES PATENTS

| | | | |
|---|---|---|---|
| 2,938,630 | 5/1960 | Novak | 210—15 X |
| 2,974,800 | 3/1961 | Fleischmann | 210—180 X |
| 3,296,122 | 1/1967 | Karassik et al. | 210—2 |
| 3,342,337 | 9/1967 | Reid | 210—152 |
| 3,379,311 | 4/1968 | Kulka | 210—97 |

FOREIGN PATENTS 13,758   1891   Great Britain.

MICHAEL E. ROGERS, Primary Examiner

U.S. Cl. X.R.

210—15, 64, 121, 181